J. G. F. HIEBER.
FRUIT PRESS.
APPLICATION FILED APR. 12, 1920.

1,435,232.

Patented Nov. 14, 1922.
2 SHEETS—SHEET 1.

Inventor
John G. F. Hieber

Herbert E. Smith
Attorney

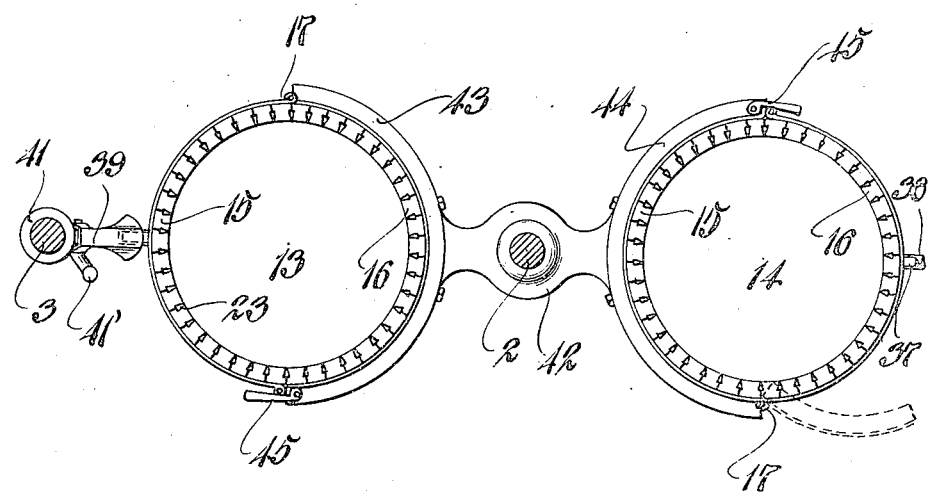
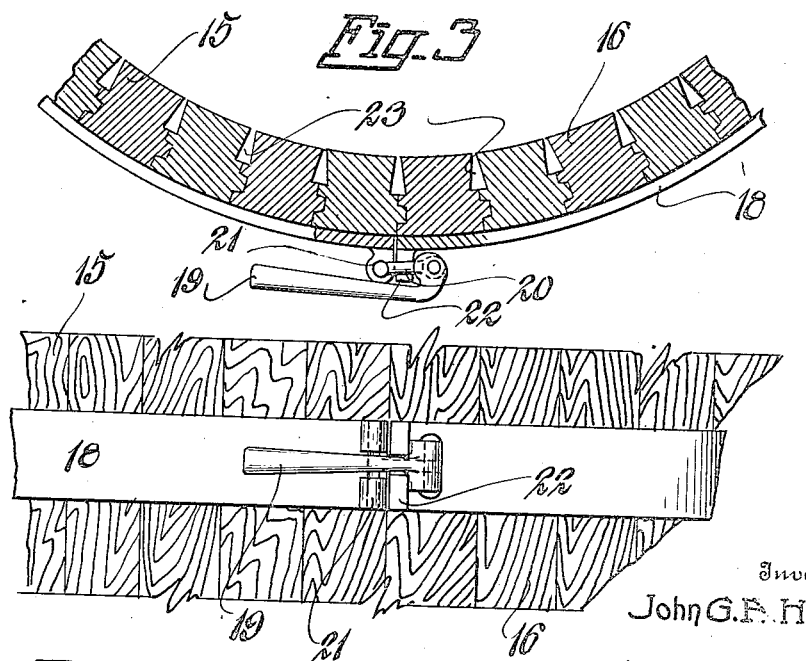

Patented Nov. 14, 1922.

1,435,232

UNITED STATES PATENT OFFICE.

JOHN G. F. HIEBER, OF SPOKANE, WASHINGTON.

FRUIT PRESS.

Application filed April 12, 1920. Serial No. 373,267.

*To all whom it may concern:*

Be it known that I, JOHN G. F. HIEBER, a citizen of the United States, residing at Spokane, in Spokane County and State of Washington, have invented certain new and useful Improvements in Fruit Presses, of which the following is a specification.

My present invention relates to an improved fruit press of the hydraulic type, designed for expressing the juices from fruits, and the purpose of the invention is to improve devices of this character in certain particulars as will be hereinafter set forth.

The primary object of the invention is the provision of a fruit press that is sanitary and free from danger of contamination of the fruit juices by corrosion, or from other objectionable causes due to use of metallic parts or elements in the operating mechanism of the press, and the invention contemplates a press that is facile in operation, comparatively simple in construction, durable, and efficient in performing its required functions.

With the above and other ends in view the invention consists in certain novel combinations and arrangements of parts involving novel means whereby a pair of baskets or containers for the fruit, are interchangeably and alternately applied for use in the press to expedite the work, and in certain novel combinations and arrangements of operating mechanism in connection therewith as will be hereinafter described and claimed.

In the accompanying drawings I have illustrated one complete example of the physical embodiment of my press utilizing a rotary or oscillatable basket support for a pair of baskets or receptacles which are alternately presented to the pressing devices, and these parts, with their connections, are combined and arranged according to the best mode I have so far devised for the practical application of the principles of my invention. It will be understood that colorable changes and alterations are contemplated, and may be made, within the scope of my claims, without departing from the spirit of my invention.

Figure 2 is a detail plan view of a pair of baskets or fruit receptacles, showing some parts in section, and illustrating the bracket arms which carry the interchangeable baskets.

Figure 3 is a detail, horizontal sectional view, enlarged of a part of one of the fruit baskets, illustrating the cam lock used to connect the free ends or edges of the sectional or hinged baskets employed in connection with the press.

Figure 4 is a detail view in elevation of the parts shown in Figure 3.

Figure 1:
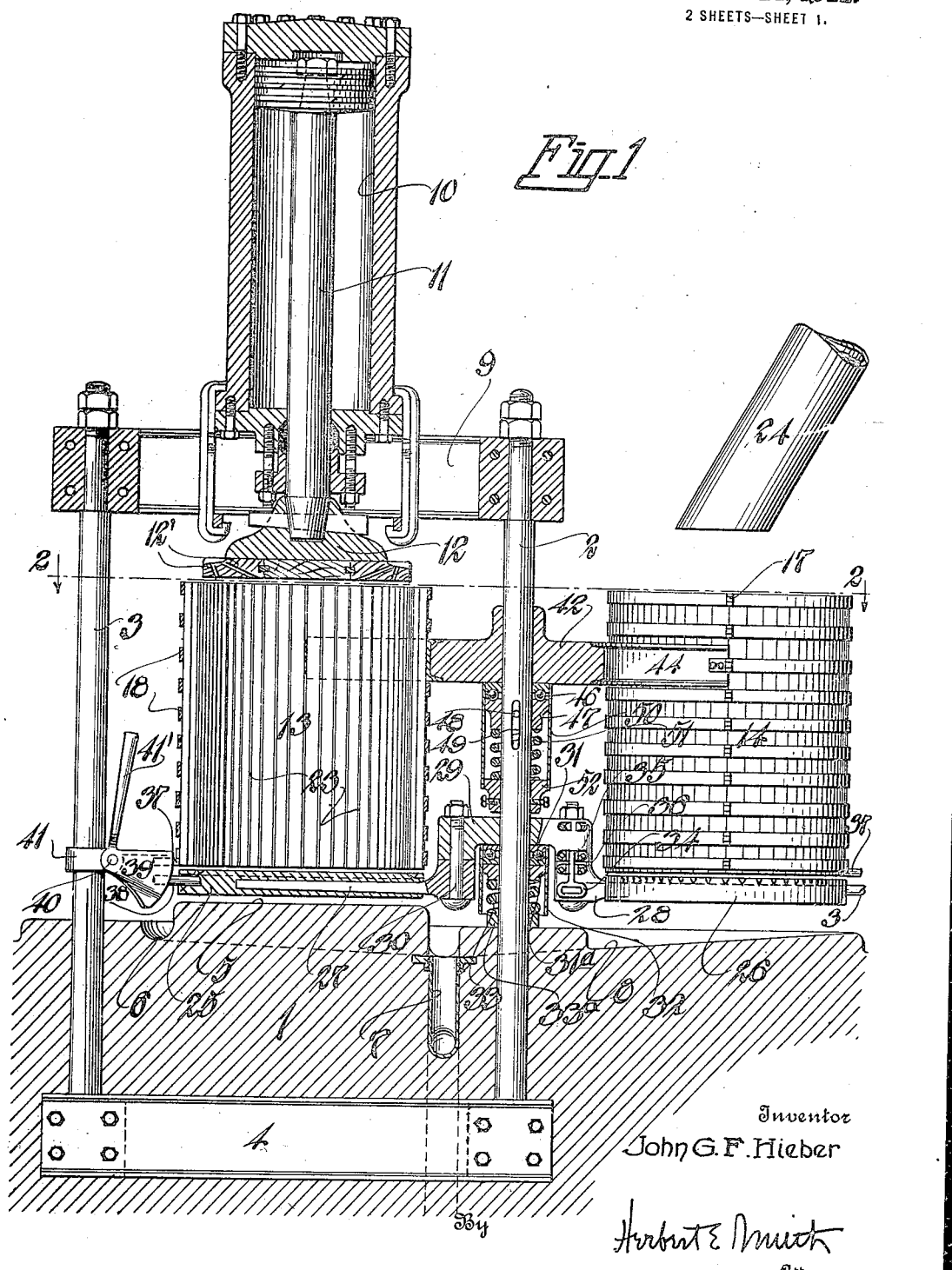
Figure 1 is a view partly in elevation and partly in vertical section of a fruit press involving the novel features of my invention.

In the preferred form of the invention as illustrated in the drawings I utilize for the support of the operating parts of the press, a substantial and solid foundation or base, made up of concrete or stone and indicated by the numeral 1, in which is embedded an upright standard 2 and a post 3 of similar design and construction but adapted for differing uses. These uprights are anchored in the solid base 1 to an I-beam or beams 4, of metal, to form a rigid and stable support for the operating parts of the press mechanism. The upper face of the base is preferably enameled or glazed to provide a sanitary surface for receiving the expressed juices from the fruits, and centrally disposed between the two uprights 2 and 3 is arranged a circular, smooth, base 5, surrounded by an annular groove or trough 6 in the top of the base, which declines toward the drain or draw-off pipe 7 vertically disposed in the base or foundation, and adjacent to the base 5 the surface of the foundation is depressed, as at 8, to insure proper drainage of fruit juices toward and into the draw off pipe 7 from which the juices may be carried in any suitable manner.

At the upper ends of the uprights 2 and 3 is arranged a transverse cross head 9 rigidly attached to each of the uprights and connecting them to support the hydraulic cylinder 10 of the press. The cylinder is centered directly above the base plate 5 and supported in suitable manner from the cross head 9, the usual piston stem or plunger 11 being operable in the cylinder and provided with a piston or expressing head 12, preferably fashioned of oak or other hard wood, and provided with fruit passages 12' for the disposal therethrough of expressed juices.

The press is equipped with a pair of similarly constructed baskets or receptacles for containing the fruit to be pressed, said receptacles being indicated as 13 and 14, and openable to facilitate emptying of the pulp therefrom. Each basket comprises two sections 15 and 16, semicircular in formation to provide a cylindrical receptacle open at the top and bottom, and hinged at 17, the staves being tongue-and-groove jointed and secured to the bands or hoops 18 for holding the parts rigidly together. At the free or openable ends of the basket sections, and diametrically opposite the hinge joints are provided cam locking levers 19 pivoted by a link 20 to a bracket 21 on one section, and adapted to engage a cam locking lug 22 on the opposite section, whereby the two sections may be drawn together at their openable edges and secured to form a complete cylindrical receptacle or basket. The adjoining faces of the staves are vertically undercut to form V-shape grooves 23 opening to the interior of the basket, and it will be noted that the grooves increase in size as they extend toward the outer periphery of the basket, thus providing passages for the juice, that is expressed from the contained fruit, to fall through to the bottom or lower end of the basket.

In charging the baskets, filter cloths or bags are utilized, and the fruit placed in these bags is deposited in the basket, the upper portion of the bag being folded over the top of the pile of fruit. A trough or hopper is indicated at 24 in Figure 1 for supplying the fruit to the basket, or rather to the filter cloth or bag within the basket, and after the top folds of the cloth have been placed over the fruit the contents of the basket is ready to receive the impact of the expressing head or plunger head 12 of the press. The bags are thus successively placed in the basket and their contents pressed, until the basket is filled to the top with pulp from which the juice has been expressed, and then, by opening the sectional baskets, the contents may be emptied therefrom.

By the construction and arrangement of fruit presses according to my invention, I am enabled to empty and charge a basket while the contents of the other basket is being acted on by the press, and then the position of these two baskets is reversed, or they are interchanged, thus alternately charging and pressing the baskets in succession. To accomplish this purpose I utilize a rotatable basket supporting mechanism including a pair of basket supporting tables 25 and 26, similar in construction and disposed about the standard 2 as a center of their pivotal or rotary movement. These tables are disposed horizontally above the base and in position to register with or center over the circular base plate 5 of the foundation to bring the baskets to position to receive the expressing head, and the diametrically opposite table is thereby brought to position to receive fruit from the supply hopper 24, as in Figure 1. Thus, while one basket is having its contents pressed, the other basket may either be emptied of its contained pulp as accumulated previous to charging, or the basket may be charged on top of the pulp contained therein, and then after the expressing action, the position of the baskets is reversed for a continuation of the process.

The tables are designed to revolve about the standard 2, and may be manipulated by hand if desired, and each table is supported by a bracket arm as 27, 28, suitably attached to the oak planks or boards forming the tables. The bracket arms are carried by a loose, revolvable head or hub 29 centered on the standard 2 and free to revolve thereabout, though the instrumentality of a pair of bolts 30, vertically disposed in the hub and arm, and forming a pivot or swivel support for the table, about the hub.

The hub is resiliently supported, and depressible with relation to its standard, and provided with a ball bearing 31 including the loose collar $31^a$ on the standard 2 about which is provided a sleeve 32 for encasing and retaining the resilient supporting spring 33 resting upon the fixed base collar $33^a$. Thus it will be apparent that the hub is revolvably supported on the standard, and is resiliently supported, through its ball bearing on the strong spring 33 interposed between the movable collar $31^a$ and the fixed collar or base collar $33^a$.

The swiveled tables may be locked in rigid relation to the hub with a pair of locking latches 34, one for each table, the latch being pivoted at 35 on the hub and adapted to engage a keeper or clip 36 on the bracket arm, as shown, and when required, the latch may be withdrawn to free the table and permit it to be swung on its pivot bolt 30 as described.

In order that the basket may be retained in alined and correct position, for the press, on its supporting table, a radial stud 37 is fixed at the lower end of the baskets which may be alined with a complementary stud 38 on the table, and an inverted U-shape yoke 39, pivoted at 40 on the bracket 41 fixed to the post 3 is used to lock the basket and table together. As shown in Figure 1, the yoke is in locked position, encasing the two studs, and it will be apparent that by swinging the lever handle $41^1$ of the yoke, on its pivot 40, the yoke may be freed from the studs to permit movement of the basket with relation to its supporting table 25.

In addition to the resilient support for the tables I utilize a resiliently supported device for retaining and centering the baskets, also located on the standard, and above the bearing hub of the tables. This latter support includes revolvable bracket head 42, of metal, rotatable and depressible on the standard, and provided with diametrically opposed bracket arms 43 and 44, preferably of channel irons and semi-circular in shape to partially encircle the baskets and retain them in position. The bracket arms are coupled to the baskets through the medium of cam locking devices 45, similar to the locks by means of which the two sections of the baskets are locked together, and by means of these cam locks the baskets may readily be locked to the arms, and with equal facility released therefrom when it is desired to remove the baskets from their tables.

Beneath the bracket head is interposed a ball bearing 46 resting upon a depressible disk 47 surrounding the standard, and the disk is held against rotation about the standard by means of a transverse pin or stud 48 movable in the slot 49 of the standard, in order that the bracket head may revolve freely on its ball bearing. A metallic sleeve 50 surrounds a spring 51 which is interposed between the depressible disk 47 and a fixed collar 52 on the standard, and it will readily be apparent that the bracket head is resiliently supported above this fixed collar, through the interposed spring, and is also free to revolve about the standard on its bearing 46.

As before stated, the fruit, (as for instance apples) is first placed in a bag or filter cloth or bag and deposited in the basket, when the latter is in the position of basket 14 in Figure 1. The top of the cloth or bag is folded over the top of the pile of apples, and then this charged basket is swung around on the standard as a center, while supported on its table, into the position of the basket 13 in Figure 1. The basket and table are now locked in proper position by means of the yoke 39 and the two locking studs 37 and 38, as in Figure 1. In this position the table 25 is resiliently supported above the base plate 5 as indicated in Figure 1, and the basket containing the fruit is in position to receive the pressure from the expressing head or plunger head 12. By the utilization of suitable motive fluid under pressure, the piston is forced down in the cylinder causing the expressing head to engage and press down on the fruit in the basket, forcing out the juices through the filter cloth. The pressure of the piston forces the basket down upon the table and the table in turn is forced down upon the base plate 5, and the impact of pressure thus exerted forces the juice to pass down the grooves or passages in the inner wall of the basket from which grooves the juice flows through the radially disposed grooves 53 at the edge of the table. From these radial grooves the juice, thus expressed, flows into the trough 6 and is disposed of through the outlet or drain pipe 7 in Figure 1.

While the above described operation is in progress, the basket at the right in Figure 1 is being filled, or charged with fruit, and when the expressing head has been retracted, the yoke 39 is released and the baskets are swung around on their standard to change places. The charge in the second basket is now compressed, and in the meantime the first basket is being re-charged, and these alternate steps are repeated until one or both baskets are filled to the limit with pulp. To dispose of the pulp or mass left in the basket, the sections of the basket are swung open and the pulp removed and emptied from the filter bags, the bags cleansed, and are again ready to be charged in the basket.

From the above description taken in connection with my drawings it is obvious that I have provided a fruit press which fulfills the conditions and objects set forth as the purpose of my invention. The fruit juice is expressed and gathered in an economical and sanitary manner, through the instrumentality of combinations and arrangements of devices whereby the functions of the press may be performed with facility and expedition. The resilient supports for the tables and baskets render the manipulation of the operating parts easy and permit rapid and expeditious movements of the comparatively heavy parts, and the uniform balance maintained for the tables and their supported baskets provide for freedom of movement of the parts under comparatively slight exertion. The special construction of the basket with the vertically disposed grooves or passages for the juice pressed from the interior of the basket provides means for conveniently and directly leading the juices to the radial grooves of the table, and the juice flowing down through the vertically disposed grooves, is freed after the expressing head is withdrawn, by the lifting of the basket from its table under pressure of the spring 49 and the juice may drip or flow over the edges of the basket and over the base plate to the annular trough as described. In normal position the baskets and tables are resiliently supported by their respective springs, thus enabling required manipulation and freedom of movement of the parts about the standard in the course of operation.

Having thus fully described my invention, what I claim as new and desire to secure by Letters Patent is—

1. The combination in a fruit press with a fixed standard and a base plate, of a depressible, resiliently supported table in position to co-act with said base plate, a basket and a resilient support therefor on the standard, and means in the basket and on the table for disposing of expressed fruit juices.

2. The combination in a fruit press with a fixed standard and base plate, of a basket supporting table, and resilient supporting means on the standard for holding the table normally above said base plate.

3. The combination in a fruit press with a supporting standard and base plate, of a pair of interchangeable resiliently supported tables on the standard adapted for selected co-action with said base plate.

4. The combination in a fruit press with a fixed standard and base plate, of a revolvable hub on the standard, and a pair of depressible basket supporting tables supported by said hub.

5. The combination in a fruit press with a fixed standard and base plate, of a resiliently supported, revolvable hub on the standard, and a pair of opposed basket supporting tables supported by said hub and adapted for selected co-action with said base plate.

6. The combination in a fruit press with a standard and base plate, of a revolvable, depressible hub on the standard, a pair of swiveled tables on the hub and means for locking said tables to the hub, baskets supported on said tables, and means for locking a selected basket and table over said base plate.

7. The combination in a fruit press with a standard of a depressible hub revolvable on the standard and a pair of tables carried by said hub, a depressible bracket head revolvable on said standard above the hub, and retaining arms on said bracket head adapted to support baskets above said tables, for the purpose described.

8. The combination in a fruit press with a pair of baskets, of a standard, a bracket head revolvable on the standard, resilient means for supporting said head with relation to the standard, and means on said bracket for supporting a fruit basket as described.

9. The combination in a fruit press with a pair of baskets, of a standard, a bracket head revolvable on the standard, resilient means for supporting said head on the standard, bracket arms adapted to encircle a portion of the baskets, and means for locking said arms to the baskets.

10. The combination in a fruit press with a supporting table having radiating edge grooves, of a basket supported thereon and provided with vertically disposed passages to convey expressed juice to said grooves.

In testimony whereof I affix my signature.

JOHN G. F. HIEBER.